(12) United States Patent
Amin et al.

(10) Patent No.: US 8,090,638 B1
(45) Date of Patent: Jan. 3, 2012

(54) SYSTEMS AND METHODS FOR EXTENDABLE SWAP

(75) Inventors: Kaushik Amin, New York, NY (US); Scott Willoughby, New York, NY (US); Daniel J. Rothman, New York, NY (US)

(73) Assignee: Barclays Capital Inc., New York, NY (US)

( * ) Notice: Subject to any disclaimer, the term of this patent is extended or adjusted under 35 U.S.C. 154(b) by 622 days.

(21) Appl. No.: 12/243,724

(22) Filed: Oct. 1, 2008

(51) Int. Cl.
*G06Q 40/00* (2006.01)

(52) U.S. Cl. ............... 705/36 R; 705/35; 705/37

(58) Field of Classification Search ......... 705/35, 705/36 R, 37
See application file for complete search history.

(56) References Cited

U.S. PATENT DOCUMENTS

| | | | |
|---|---|---|---|
| 6,263,321 B1 | 7/2001 | Daughtery, III et al. | |
| 6,304,858 B1 | 10/2001 | Mosler et al. | |
| 2002/0111891 A1* | 8/2002 | Hoffman et al. | 705/36 |
| 2004/0162772 A1* | 8/2004 | Lewis | 705/34 |

OTHER PUBLICATIONS

"Bond evaluation, selection, and management" by Stafford Johnson 2004 http://books.google.com/books?hl=en&lr=&id=3GXjt2m AFpkC&oi=fnd&pg=PP28&dq=extendable+swap+trading+system &ots=GmqlyJhkh_&sig=aRxefcXwot2DzE8KL9zlAwBPLMI#v= onepage&q=extendable%20swap%20&f=false.*

Dominic O'Kane and Stuart Turnbull "Valuation of Credit Default Swaps" Apr. 2003.

* cited by examiner

*Primary Examiner* — Lindsay M Maguire
*Assistant Examiner* — James Vezeris
(74) *Attorney, Agent, or Firm* — Morgan Lewis & Bockius LLP

(57) ABSTRACT

A system and method for providing an extendable swap is provided. In a preferred embodiment, two parties enter into an ISDA Master Agreement and then negotiate one or more OTC derivative transaction agreements, including interest rate swaps, cross-currency swaps, commodity swaps, equity swaps and/or currency swaps. The parties negotiate terms including conditions precedent to the automatic extension of the extendable swap. Where the condition(s) precedent are met at the end of a period, the agreement automatically renews for another period (with the same terms), up to a final termination date. Where the conditions precedent are not met, the contract in not renewed, and the agreement terminates on the relevant anniversary date. Such a swap enables a party to offer better pricing due to period valuations and probabilities that are used to calculate the price of the swap.

24 Claims, 7 Drawing Sheets

Parent-Subsidiary Cross Currency Swap

A may or may not have income (660A) or payments (630A), however, these are not important in the swap consideration.

More complicated Two-Party Interest Rate Swap: A&B both borrow and swap payments Also note that B could be an independent lender, rather than a party that must obtain funds, and that 130B, and 110B here are hedges for the market for B being a lender.

Three party interest rate swap with B as a Broker for Both A & C

Transactions between AB and BC simple interest rate swaps. In this way, B will make $ no matter which way the market moves. Additionally, B may hedge (not shown)

B is a broker and enters two independent Swap Agreements

The initial transaction parts may also include exchanging principal amounts to limit exchange rate liability. Could also reserve principal until the end.

Parent-Subsidiary Cross Currency Swap

A may or may not have income (660A) or payments (630A), however, these are not important in the swap consideration.

SYSTEMS AND METHODS FOR EXTENDABLE SWAP

CROSS REFERENCE TO RELATED APPLICATION

This application claims the benefit of U.S. Provisional Patent Application No. 60/638,217, filed Dec. 21, 2004, the disclosure of which is hereby incorporated by reference.

BACKGROUND

In the past, parties entered into over the counter ("OTC") derivative transactions by negotiating separate agreements for each transaction. Each agreement would by necessity include the legal and financial relationships between the parties. Each time the parties entered into a transaction, all of the terms and relationships would have to be negotiated. To improve efficiency, parties often enter into a "master agreement" which provides the framework for ongoing legal and credit relationships that will govern all future transactions. Often, a master agreement will cover different types of transactions, e.g., currency swap, cross-currency swap, interest rate swap, commodity swap, basis swap, option, future, etc., avoiding the need for parties to enter separate agreements for each transaction type.

One such master agreement is offered by the International Swaps and Derivatives Association, Inc. ("ISDA"). When parties negotiate and execute an ISDA Master Agreement they agree to an ongoing legal and credit relationship. Typical ISDA Master Agreements include the 1992 and 2002 versions of the Master Agreement, both of which are incorporated herein by reference. ISDA also publishes supplementary materials related to various types of transactions, including definitions of terms typically used in the Master Agreement, schedules, and related confirmations. These definitions are typically incorporated into the Agreement.

A more detailed description of the ISDA Master Agreement and associated materials is provided at http://www.isda.org. An introduction to derivatives is also provided at http://www.isda.org/educat/pdf/ten-themes.pdf, and a further description of derivatives and the ISDA is provided at http://www.isda.org/educat/pdf/documentation_of_derivatives.pdf.

Parties who wish to amend the ISDA Master Agreement will typically negotiate schedules that amend, describe, and/or revise the Agreement, rather than amending the Agreement itself. Additional provisions not included in the Master Agreement may also be added via schedules. One provision that parties often revise or add is whether to be governed by New York or English law.

After two parties enter into a Master Agreement, only the terms of a subsequent transaction need to be negotiated and documented. The documents and any other confirming evidence exchanged between the parties which, taken together, confirm all of the terms of the transaction are defined as "confirmations." Confirmations are normally subject to the terms of an associated Master Agreement, related schedules, definitions, etc.

Of particular interest are interest rate swap and cross-currency swap transactions. In a simple interest rate swap, one party pays a fixed interest rate on a principal amount (but wishes to pay a floating rate), and a second party pays a floating interest rate on a principal amount (but wishes to have a fixed rate payment). Accordingly, the parties may contract to "swap" payments, (i.e., to make payments to each other), which are in turn used to pay the interest due to their respective lenders. Contract terms of the swap typically include all relevant aspects of the transactions, including, e.g., the length of the contract, the number of payments per year, the number of total payments, the interest rates, the principal amounts involved, etc. In such a swap, each party makes two payments and receives one payment, with the received funds netting out one of the payments.

For example, suppose A and B have each taken out loans with the following terms: A pays a fixed 7% on principal to its lender in quarterly installments for 10 years and B pays a floating rate on principal to its lender in quarterly installments for 10 years. B's floating rate may be based on current interbank loan rates, i.e., the interest rate one bank borrows funds from another bank. However, the parties may agree to use any index or floating rate desired. Representative interbank loan rates include the London Interbank Offered Rate ("LIBOR"), or the Euro Interbank Offered Rate ("EURIBOR").

As part of the interest rate swap, A and B may enter into an agreement where A pays B the floating rate amount and B pays A 7%. The effect of this agreement is that A initially contracted to pay a fixed rate (7%), and now pays a floating rate (RATE), i.e., receiving 7% from B and paying 7% to its bank, while also paying rate to B. The converse is also true, whereby B initially contracted to pay a floating rate (RATE) and now pays a fixed rate (7%), i.e., the netted effect of B receiving RATE from A and paying RATE to its bank, while also paying a fixed 7% to A.

There are many reasons why companies enter into such agreements, including leveraging relative or comparative market positions, hedging interest rate exposure, obtaining lower cost funding, or speculating how future interest rates will move. Despite different motivations or terms of these agreements, the effect is to "swap" a floating interest rate for a fixed one, and vice versa. Those skilled in the art will recognize that principal amounts for interest rate swaps are typically notional and not exchanged, and that the amounts due to the parties may be netted rather than having both parties make full payments to each other.

A cross-currency swap is similar to an interest rate swap, but with each part of the transaction denominated in a different currency. For example, suppose A wishes to have a principal amount in English pounds (£) and also wishes to pay a floating interest rate for 10 years. However, A's credit rating in the U.S. elicits more favorable loan terms when borrowing U.S. dollars ($) at a fixed interest rate. A may be able to borrow at 10% fixed and LIBOR+1.5% in the U.S., while only qualifying for a best U.K. fixed loan rate of 12% and a best floating loan rate of LIBOR+3%.

Accordingly, A may then borrow a principal amount in $ at a fixed 10% interest rate. A is then obligated to make interest rate payments to its original lender in $. A may then "swap" the U.S. principal for £, and negotiate a floating interest rate as well. To do this, A enters a cross-currency swap agreement with an exchange dealer, B, that will convert the U.S. principal into £, and also swap the 10% fixed interest rate (in $) for a LIBOR based interest rate (in £), e.g., LIBOR+2.25%. In this way, A has achieved its goal of borrowing £ and paying a floating interest rate while leveraging its favorable credit position in the U.S. As will be recognized, the fixed 10% payment (in $) due on A's principal loan amount is effectively paid by B (B pays a $ interest amount to A as part of the swap agreement), and A pays a floating LIBOR rate to B that is lower than the rate it could have achieved in the U.K. market itself (A pays a £ interest amount to B as part of the swap agreement).

As will be recognized by those skilled in the art, many variations on the above cross-currency swap exist, e.g., swapping one currency for another and a fixed for fixed interest rate swap, swapping one currency for another and a floating for floating interest rate swap, etc. Further, there are many scenarios where parties may enter into cross-currency swaps, e.g., investing in a foreign asset while eliminating foreign currency exposure, obtaining needed funds in one currency at the most favorable rates, creating synthetic foreign currency liabilities (debt) to offset foreign assets, etc.

As will be further recognized, where two parties contract to make payments to each other, there is a possibility that one of the parties may default on their payments. When one party defaults, the counter-party is still responsible for any payments due to their original lender. Accordingly, parties to interest rate or cross currency swaps may desire to limit their financial exposure in the event that their counter-party stops making payments. A party may stop making payments for any number of reasons, including bankruptcy, financial restructuring, other liquidation proceedings, or any other "termination event." Termination events are typically described in the Master Agreement, schedules, or confirmations associated with a particular transaction and are types of events that will automatically terminate the remainder of the swap agreement.

Many approaches have been developed to reduce liability in the event of a termination event or other default, including a float asset approach and a flawed asset approach. These methods are known to those skilled in derivatives trading. The flawed asset approach is often called a "conditional payment" approach since a condition precedent to payment must occur. For example, a condition precedent to party A making a payment to party B may be that party B is not currently in bankruptcy. If B is in bankruptcy, A will make no payment until B fulfills the condition precedent to payment, i.e., comes out of bankruptcy. The 1992 ISDA Master Agreement contains such a provision in section 2(a)(iii), providing that a party is not obligated to make a payment where an Event of Default has occurred and is continuing. Events that are covered by the term Event of Default are defined within the Master Agreement, and include bankruptcy, merger without assumption, misrepresentation, etc. Where a Default event occurs, the non-defaulting party is under no obligation to make further payments under the agreement.

In the UK, for example, the flawed asset approach is used for interest rate swaps and results in a "self extinguishing" swap when a default (bankruptcy or other termination event) occurs. In particular, when a default event occurs, the swap self-extinguishes and its value goes to zero. This is beneficial in that it reduces the risk to the parties in the event of a bankruptcy or other termination event. For example, where a 10 year swap is executed, a default probability can be calculated using default probability curves or any known valuation method, and the potential value of the entire swap agreement at the time of a default can be determined and paid up front. Then, if a default occurred, the swap value would go to zero (extinguish), and no party would have further potential liability.

The flawed asset approach also has been used in Australia. In one instance, two parties entered into a Master Agreement and numerous swap agreements. Under their Master Agreement, when one party defaulted under the Event of Default provision, the other party had the option of terminating the agreement (and all related transactions) early, or withholding further transaction payments under a condition precedent clause similar to that described above. The non-defaulting party elected to withhold payments instead of terminating the agreement. The Australian courts ruled that the contractual condition precedent clause was valid, and the non-defaulting party was not obligated to make further payments.

As will be recognized by those skilled in the art, in the United States, non-debtors ordinarily cannot terminate contracts with debtors by relying on termination provisions that are triggered by the financial condition of the debtor or by the debtor initiating bankruptcy proceedings.

Termination of contracts between debtors and non-debtors is addressed in the U.S. Bankruptcy Code. In general, the Code prohibits terminating most types of contracts. These limitations are discussed in general at 11 U.S.C. §365(e)(1) [U.S. Bankruptcy Code §365(e)(1)]. However, certain types of agreements are granted safe harbor, and where properly drafted, provide additional safeguards to the non-debtor. In particular, certain swap agreements may benefit non-debtors in certain situations.

Section 101(53B) of the Bankruptcy Code defines a swap agreement as follows:

(A) an agreement (including terms and conditions incorporated by reference therein) which is a rate swap agreement, basis swap, forward rate agreement, commodity swap, interest rate option, forward foreign exchange agreement, sport foreign exchange agreement, rate cap agreement, rate floor agreement, rate collar agreement, currency swap agreement, cross-currency rate swap agreement, currency option, any other similar agreement[1] (including any option to enter into any of the foregoing);

[1]"Any other similar agreement" is "best interpreted as including other agreements that from time to time are utilized by the swap market." *Collier on Bankruptcy*, 15$^{th}$ ed. Rev., ¶101.53B.

(B) any combination of the foregoing; or (C) a master agreement for any of the foregoing together with all the supplements.

11 U.S.C. §101(53B) (emphasis added).

Agreements that qualify as swap agreements under section 101(53B) are entitled to the protections of, among other provisions,[2] sections 362(b)(17) (the automatic stay does not apply to setoffs involving swap agreements)[3] and 560. Section 560, captioned "Contractual right to terminate a swap agreement," states:

[2]Pursuant to section 546(g), swap agreements are also exempt from a trustee's avoidance powers under section 544, 545, 547, 548(a)(1)(B) and 548(b) of the Bankruptcy Code.

[3]Section 362(b)(17) states that the filing of a petition "does not operate as a stay of the setoff by a swap participant, of any mutual debt and claim under or in connection with any swap agreement that constitutes the setoff of a claim against the debtor for any payment due from the debtor under or in connection with any swap agreement against any payment due to the debtor form the swap participant under or in connection with any swap agreement or against cash, securities, or other property of the debtor held by or due from such swap participant to guarantee, secure or settle any swap agreement."

The exercise of any contractual right of any swap participant to cause the termination of a swap agreement because of a condition of the kind specified in section 365(e)(1)[4] of this title or to offset or net out any termination values or payment amounts arising under or in connection with any swap agreement shall not be stayed, avoided, or otherwise limited by operation of any provision of this title or by order of a court or administrative agency in any proceeding under this title. As used in this section, the term 'contractual right' includes a right, whether or not evidenced in writing, arising under common law, under law merchant, or by reason of normal business practice.

[4] The conditions specified in section 365(e)(1) include the insolvency or financial condition of the counterparty or its commencement of a case under Chapter 11.

Further, the legislative history regarding swaps indicates the intent of Congress to provide additional protections to certain transactions.

Legislative History

Sections 101(53B) and 560 were added to the Bankruptcy Code in 1990. The relevant legislative history indicates that the purpose of the new sections was "to clarify U.S. bankruptcy law with respect to the treatment of swap agreements [and] . . . provide certainty for swap transactions in the case of a default in bankruptcy," because interest rate and currency swap agreements are a "vital risk management tool in world financial markets." Senate Report, 285, 101$^{st}$ Cong. House Banking Chairman Jim Leach noted that the "legal uncertainty surrounding swaps 'threatens the safety and soundness of banks and poses systemic risk to the financial system as a whole.'" American Banker, Volume CLXV No. 144, quoting Rep. Leach. Congress was concerned that "if one of the parties to a swap agreement file[d] for bankruptcy under the current Bankruptcy Code, the non-defaulting party [will be] left with a substantial risk . . . [which] could cause a rippling effect which would undermine the stability of the financial markets." Senator Heflin, *Interest Swap: Hearing on S. 396 Before the Subcomm. on Courts and Administrative Practices of the Senate Comm. on the Judiciary,* 101$^{st}$ Cong. 1 (1989). Furthermore, Representative Fish made clear that the swap sections were added to ensure the "stability of the swap market." *Collier on Bankruptcy,* 15$^{th}$ ed., ¶ 560.LH at 560-11-12, quoting 136 Cong. Rec. H 2282 (May 15, 1990). Based on this legislative history, as well as the actual language of the code, it is clear that Congress intended to protect a broad variety of swap agreements in order to bring certainty to the swap market.

As will be recognized, enforcing swap agreements typically will be addressed in state courts. Since the ISDA Master Agreement provides a mechanism for parties to elect English Law or the law of the State of New York, a discussion of New York law is presented below.

New York State Law

Under New York law, where a liquidated damages provision bears a "reasonable proportion to the actual loss," it will most likely be enforced. *Equitable Lumber Corp. v. IPA Land Development Corp.,* 381 N.Y.S. 2d 459, 463 (NY 1976). In particular, where a liquidated damages provision in a swap agreement "call[s] for a value which represents the actual cost of cover for the Swap Agreement on the date of the default," such provision will be honored. *Drexel Burnham Lambert Products Corp. v. MCorp,* 1991 Del. Super. Lexis 298, at *9 (Del. Superior Ct. 1991) (provision set damages as the costs to enter into a substitute agreement). Furthermore, in considering a liquidated damages provision, New York courts will consider the intent of the parties as set forth in such provision. See *Truck Rent-A-Center, Inc. v. Puritan Farms* 2nd, Inc., 41 N.Y.2d 420 (N.Y. 1977) (in honoring the liquidated damages provision, the court considered the fact that the provision stated that it was entered into by the parties based on the consideration of various factors, including the costs of the non-terminating party).

In some instances, parties may enter swap agreements that may be extended beyond their initial maturity date. For example, some prior art teaches an extendable interest rate swap (often called extendable or extendible swaps. See, for example, http://www.equanto.com/glossary/e.html and http://www.analyticalq.com/energy/volatility/table1.htm). However, these prior art extendable swaps are actually just interest rate swaps with an option to extend the swap at the same terms for an additional period or periods. Further, the pricing of the prior art extendable swaps does not contemplate numerous factors in the pricing of the swap, e.g., pre-settlement risk, defaulting parties, the periodic valuation of the swap, the periodic discounting of the swap, the probabilities of default of either party, the reduction in maximum liability, etc.

Additionally, less favorable pricing may be offered to the party that wishes to purchase the extension in exchange for the right to lock in an additional period under the current swap terms; i.e., the purchaser of the option to extend pays a premium for that option. For example, where on-market terms would require a party to make payments for a swap at a fixed 5.00%, the purchaser of the swap and option to extend may be required to make above market payments, e.g., 5.25%. Conversely, where on-market terms would entitle a party to receive a fixed 5.00% payment, purchasing the right to extend may result in unfavorable payments, e.g., 4.85%.

These prior art extendable swaps are unilateral extensions where one party elects to preserve the current terms of a swap agreement for additional time; i.e., such swaps give one party the right, but not the obligation, to extend the swap at some point in the future, usually at the original maturity date. The swap could be extended once, or more, for pre-defined periods (e.g. 2 additional years). Increasing the number of possible extensions typically results in an increased price for the party purchasing the option. However, the non-purchasing party could not initiate an extension, and the extension may not be automatic.

For example, a company may currently be making floating interest rate payments but may wish to make fixed interest rate payments. Accordingly they may enter a 2 year interest rate swap with a counterparty where they pay the counterparty a fixed market rate (e.g., a fixed 5.00%) and receive the floating payment amount. However, they may still be concerned that floating rates will be unfavorable at maturity, and may "purchase" an option to extend the current swap at the same terms for an additional 2 years. The pricing for this swap and option to extend may result in the company paying a higher fixed rate of 5.25% to the counterparty for the first 2 years with an option to extend at the same 5.25% for a second 2 year term (alternately, as described above, they may receive an unfavorable floating payment). While the company pays higher than market interest rate payments for the first 2 years (by 25 basis points), they have the security that should the floating rate rise above 5.25%, they can extend the swap for an additional 2 years at 5.25% rate. Of course, if the floating interest rates decrease, they can elect not to extend the swap. As will be recognized, the counterparty may wish to purchase the option to extend, and accordingly may receive unfavorable fixed payments (or may pay above market floating rates) for the option to extend.

As a second example, a company may issue a bond paying a fixed 5.00% coupon for 5 years, callable in 3 years. The company may wish to swap the fixed payments for floating payments based on LIBOR, but may also be concerned that the bond will be called in 3 years. Accordingly, they may enter a 3 year swap with a 2 year extension. The terms of an on-market interest rate swap may be the company paying LIBOR+some basis to the counterparty and receiving a fixed 5.00% payment. However, the extendable option may result in the company either paying LIBOR plus a higher basis, or receiving a lower fixed payment. If the bond is not called in the 3$^{rd}$ year, the company may elect to extend the current swap for the remainder of the bond's lifetime. If the bond is called, the company would most likely let the option expire worthless.

Additionally, as recognized by those skilled in the art, a transaction's value and any discounts based on event probabilities (e.g., probability of a default) are based on the lifetime of a transaction, and may not contemplate a periodic valuation of the transaction or periodic discounting probabilities. That is, any reduction in the value (i.e., discounting) may be applied to the calculated lifetime value of the transaction. These types of transactions may not consider the value of a sub-period of the transaction, and did not discount based on a probability calculated relative to a sub-period.

Therefore, it is apparent that there is a need for parties entering various financial transactions to be able to limit their exposure regarding an Event of Default (as defined in the ISDA Master Agreement, the associated schedules, and/or confirmations, such as bankruptcy, restructuring, etc.) Further, there is a need for a financial transaction that will extinguish at the end of a period in the event where particular conditions are not met during that period. There is also a need for a swap transaction that can be extended automatically at the end of a period that offers favorable pricing to the parties. Additionally, there is a need for a swap transaction that is valued using periodic calculations of values and that also utilizes periodic discount probabilities.

SUMMARY

One aspect of the invention involves two parties entering into an ISDA Master Agreement governing all future transactions that the parties may negotiate and enter into. The parties may negotiate one or more OTC derivative transaction agreements, including interest rate swaps and/or cross-currency swaps. Each agreement, including any schedules and/or confirmations, defines the terms that the parties agree to. These defined terms may include start date, exchange rates, the principal amounts, the interest rates, payment amounts, payment periods, the final amounts, etc. The terms and conditions are described in greater detail below.

Each agreement also may define one or more termination dates for the agreement. These termination dates are automatically extended at the end of a period up to a final termination date when certain conditions precedent are met. Such conditions precedent are discussed in greater detail below. For example, where the condition(s) precedent are met at the end of a period, the agreement automatically renews for another period (with the same terms), up to the final termination date. Where the conditions precedent are not met, the contract is not renewed, and the agreement terminates on the relevant anniversary date.

As will be recognized, any final termination date as well as any periodic termination dates can be negotiated by the parties, e.g., a 20 year final date with 2 year periods, a 4 year final date with 6 month periods, etc. In one embodiment, as described in greater detail below, one or more computer systems are utilized to calculate the best possible terms for the agreement, including, e.g., final and periodic termination dates for one or more of the parties.

For example, suppose that two parties enter into an agreement that terminates yearly, with a final termination date ten years from the start of the agreement. Where the conditions precedent are met on the contract's first anniversary, the contract renews for another year. On the second anniversary, a subsequent analysis of the conditions precedent will occur before the agreement will renew into the third year. As expected, each year the conditions precedent are evaluated prior to a renewal, up to the final termination date, at which time no further renewals can be obtained.

As mentioned above, certain conditions precedent must occur prior to an agreement renewal. One condition precedent is that no Event of Default ("Default") has occurred. Such events are preferably interpreted consistently with the ISDA definition, however, they also may be independently defined. In one embodiment, where no Default has occurred, the condition precedent is met, the agreement is renewed, and the parties continue making payments as negotiated. However, where a default has occurred, the condition precedent is not met, so neither party is obligated to make additional payments, and the swap agreement is automatically terminated. In another embodiment, the obligations under the swap agreement are deferred until the underlying Default is remedied. By providing the extendibility feature, parties to extendable swaps may limit their settlement risk. Settlement risk is the risk to which a party to a transaction will be exposed in the event the counterparty defaults. As noted above, many methods are currently in place to limit such risk, but the present system and method improves upon the aforementioned methods by limiting the party's maximum potential risks of loss due to the failure of the counterparty, since (i) the maximum potential net payments over any single year of the transaction are much lower than for a full term transaction; (ii) a party has a lower likelihood of paying a large sum to the counterparty upon early termination of the transaction; (iii) no additional liabilities past termination can be incurred by either party; (iv) both parties will be able to hedge potential liabilities periodically (e.g., yearly) rather than for the life of the transaction, and (v) the agreement will most likely be granted safe harbor under the U.S. Bankruptcy Code.

A preferred embodiment of the present system and method values the likelihood of default per period and use this value to determine the terms and pricing of the extendable swap. For example, a value is calculated that represents the maximum (or average) swap values for a period multiplied by the likelihood of default for that period only. The value for all periods is added, yielding in a total value for the swap. This calculated value then is used in the determination of swap terms and pricing.

Since typical swap pricing methods incur the cost of default over the lifetime of the swap, it was not possible to offer the best pricing to clients where the swap terms were based on discounted values of sub-periods, i.e., based on the expected swap value for each a sub-period and the likelihood of a default for that sub-period. By using the present system and method, a party can offer more favorable pricing for an extendable swap than for its non-extendable counterpart. By using a distribution table or graph illustrating the values of a particular transaction for some period in the future, the mean and maximum values can be calculated. As will be recognized by those skilled in the art, the mean and/or maximum exposures are reduced at the end of a period by the periodic payment of interest, e.g., net interest payments.

In one aspect, the invention comprises a system comprising: (a) a calculation component operable to determine a plurality of financial transaction values for an extendable swap, the extendable swap comprising a start date, a periodic termination date, and a final termination date, wherein the financial transaction values comprise at least one of: (i) a probability that a party will default during one or more periods of the extendable swap, (ii) a value for the extendable swap for each of the one or more periods of the extendable swap, and (iii) a value for the extendable swap over the entire term of the swap; (b) a pricing component based on one or more of the plurality of financial transaction values operable to determine a plurality of terms of the extendable swap; and (c) an evaluation component operable to determine one or more conditions required for automatically extending the extendable swap for an additional period, up to the final termination date, wherein the extendable swap is automatically extended only when the conditions are met.

In various embodiments: (1) the system further comprises a notification component operable to receive notifications related to the extendable swap and, in connection with the evaluation component, to transmit notifications regarding compliance or non compliance with the terms of the extendable swap; (2) the swap transaction value for a future period of time is a mark to market value for the future period of time; (3) the pricing component discounts a value of a future period based on a probability that a party will default during that future period; (4) the pricing component discounts the value of the entire term of the swap based on the probability of default for each of the one or more periods of the extendable swap; (5) the extendable swap is an extendable interest rate swap; (6) the extendable swap is an extendable cross currency swap; (7) the extendable swap is an extendable commodity swap; (8) the extendable swap is an extendable equity swap; (9) the extendable swap is an extendable currency swap; (10) the one or more conditions required for automatically extending the extendable swap are based on one or more defined credit events; (11) the credit events are defined by the International Swap Dealers Association; and (12) the credit events are defined in the 2003 International Swap Dealers Association Credit Derivatives Definitions.

In another aspect, the invention comprises a method comprising: (a) calculating a plurality of financial transaction values for an extendable swap, the extendable swap comprising a start date, a periodic termination date, and a final termination date, wherein the financial transaction values comprise at least one of: (i) a probability that a party will default during one or more periods of the extendable swap, (ii) a value for the extendable swap for each of the one or more periods of the extendable swap, and (iii) a value for the extendable swap over the entire term of the swap; (b) determining, based on one or more of the financial transaction values, a plurality of terms of the extendable swap; and (c) evaluating one or more conditions required for automatically extending the extendable swap for an additional period, up to the final termination date, wherein the extendable swap is automatically extended only when the conditions are met.

In various embodiments: (1) the method further comprises a step of receiving notifications related to the extendable swap and, in connection with the evaluation step, transmitting notifications regarding compliance or non compliance with the terms of the extendable swap; (2) the swap transaction value for a future period of time is a mark to market value for the future period of time; (3) at least one of the financial transactions values is used to discount the value of a future period based on the probability that a party will default during that future period; (4) at least one of the financial transaction values is used to discount the value of the entire term of the swap based on all probabilities of default for each of the one or more periods of the extendable swap; (5) the extendable swap is an extendable interest rate swap; (6) the extendable swap is an extendable cross currency swap; (7) the extendable swap is an extendable commodity swap; (8) the extendable swap is an extendable equity swap; (9) the extendable swap is an extendable currency swap; (9) the one or more conditions required for automatically extending the extendable swap are based on one or more defined credit events; (10) the credit events are defined by the International Swap Dealers Association; and (11) the credit events are defined in the 2003 International Swap Dealers Association Credit Derivatives Definitions.

In another aspect, the invention comprises a method for matching swaps comprising: (a) storing data related to a party's existing extendable swap transactions; (b) pairing offsetting extendable swap transactions; and (c) sending a notification to the party relating to offsetting transactions.

In various embodiments: (1) the data related to the party's existing extendable swap transactions comprises information related to at least one of: existing fixed for floating extendable swap transactions, existing floating for fixed extendable swap transactions, and existing cross currency extendable swap transactions; (2) the pairing step comprises evaluating a plurality of extendable swap transactions to locate extendable swap transactions that result in predefined hedging conditions; (3) the hedging conditions comprise whether hedges offset; (4) the extendable swap transactions are fixed for floating extendable swap transactions; (5) the extendable swap transactions are floating for fixed extendable swap transactions; (6) the extendable swap transactions are extendable cross currency swap transactions; (7) the extendable swap transactions are extendable commodity swap transactions; (8) the extendable swap transactions are extendable equity swap transactions; (9) the extendable swap transactions are extendable currency swap transactions; (10) the notification relating to offsetting transactions relates to one of the existence or absence of offsetting transactions; and (11) the notification relates to the party's financial exposure.

DETAILED DESCRIPTION OF PREFERRED EMBODIMENTS

Figure 1:
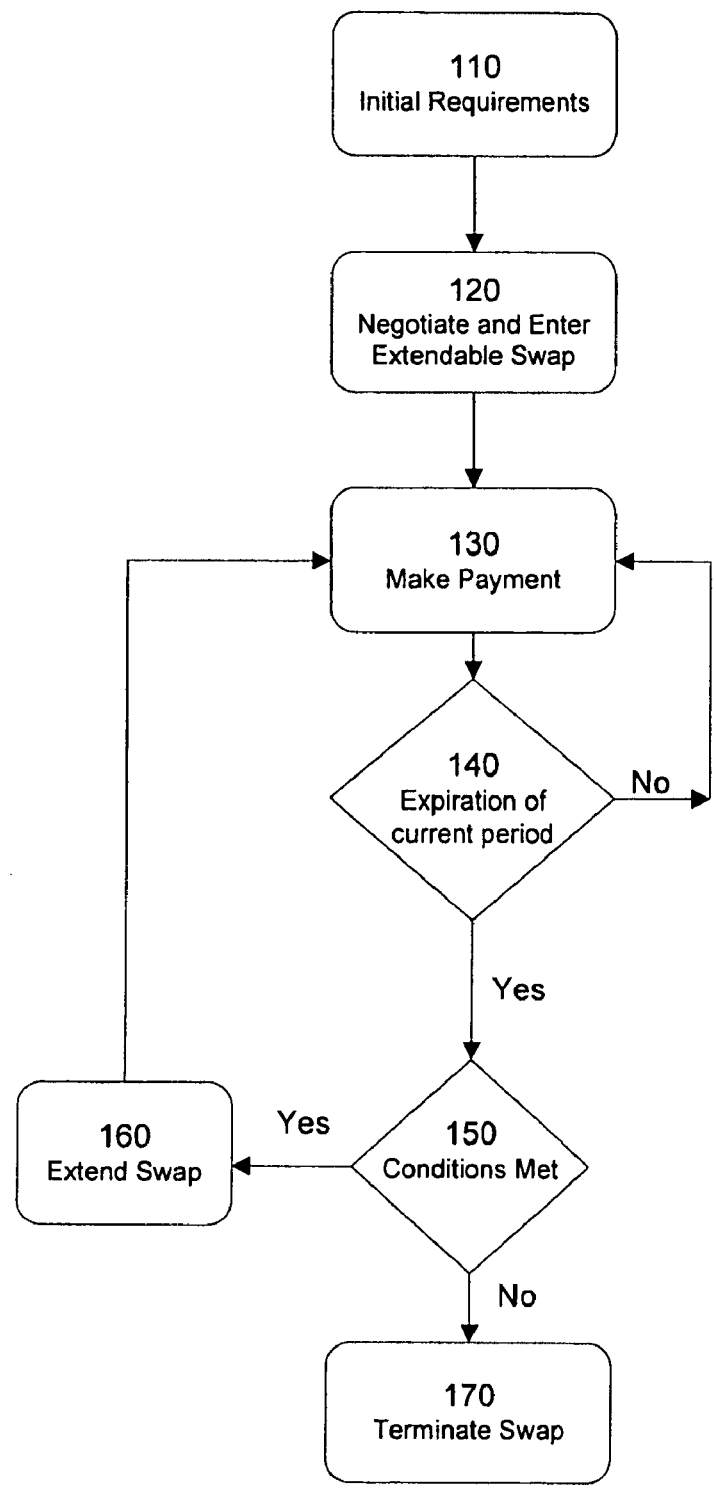
FIG. 1 is a flow diagram illustrating one embodiment of an extendable swap.

FIG. 1 is a flow diagram illustrating one preferred embodiment of the present system and method. As shown in FIG. 1, two or more parties may enter into an extendable swap. Such extendable swaps preferably include extendable interest rate swaps, discussed below in connection with FIGS. 2-5, and extendable cross currency swaps, discussed below in connection with FIGS. 6-7. Further, and as will be recognized by those skilled in the art, other embodiments may include extendable commodity swaps, equity swaps, and currency swaps.

Each party to the extendable swap will have a counterparty, i.e., an opposite party to the transaction, wherein the party and counterparty both agree to fulfill obligations as defined in the swap agreement.

In step 110, the parties wishing to enter an extendable swap complete any preliminary requirements necessary to enter the extendable swap. Such preliminary requirements may include entering into other financial transactions (e.g., a prior loan) and determining preliminary values necessary to calculate the terms of the extendable swap. Such preliminary requirements also may include determining the default probability for a party or counterparty for a particular period, e.g., one year, calculating the future value of the entire swap, calculating the future value of a particular period of the swap, discounting a period's future value based on the calculated default probability, determining the payment terms of the extendable swap, determining the timing of the payments of the swap agreement, etc.

Further, in a preferred embodiment, the parties to an extendable swap enter (or have previously entered) into an ISDA Master Agreement. Such agreements are known in the art and, as described above, typically enumerate the relationships of the parties for all covered transactions. In this way, only the financial details of a particular transaction need to be negotiated.

In a preferred embodiment, the pricing for an extendable swap is done by electronically calculating the expected future cash flows and discounting each cash flow by the probability that either counterparty defaults before that cash flows occurs. In general, this can be done using software-implemented analytic models, a grid (or tree) based model, a Monte Carlo model, or a variety of other implementations as will be apparent to those skilled in the art. Monte Carlo calculations are well known in the art, so a detailed review of such calculations is not presented here.

In one preferred implementation, calculations are performed using a software-implemented hybrid of a grid based model and a Monte Carlo model. The grid model is used to electronically calculate the mark to market of the underlying non-extendable trade at all potential times and states in the future as well as the mark to market of the series of shorter trades that comprise the extendable. The Monte Carlo method then simulates the states of the underlying market as well as the state of the two credits throughout the life of the trade. Thus it predicts the state of the underlying market as well as the probability of default of either counterparty at each step along the way. At each step along the Monte Carlo path, the Monte Carlo simulation software queries the grid calculations to find the mark to market of the two potential states of the underlying trade. It then calculates the value of the extendable at that step, incorporating the default probabilities. In this manner, the Monte Carlo software can take into account the fact that there will be recovery on the remaining cash flows of the short (non-extended) swap if extension does not occur. It can also take into account the impact of ratings-based collateral schedules, as well as other credit mitigants that might impact the value of this trade.

As will be recognized, other solutions can be implemented. These could include an implementation that is entirely calculated on a grid, using one or more state variables to define the interest rate (or other) underlying market and one or more state variables to define the default probabilities. Similarly, a purely Monte Carlo solution could be implemented where all state variables walk along the path and all possible mark to markets are calculated directly by the Monte Carlo software. In a preferred implementation, market inputs are used to calibrate the model. Many calibration methods are known in the art; however, a typical calibration process uses the market prices of liquid derivative instruments to determine a set of model parameters that gives the desired results—e.g., calculated prices are close to actual derivative market prices. That is, calibrating is the modification of existing model parameters to give results closely resembling observed market prices. Model calibration is computationally quite intensive and typically requires high-dimensional nonlinear optimization. Calibration also relies on the availability of market prices for the liquid instruments. As is known in the art, computer systems may normalize data that will be used in calibrating and may also be used in the calibrating step itself.

In one embodiment, standard market inputs from the underlying derivative market are used to calibrate the state variable used to calculate the underlying swap and the series of shorter dated swaps that comprise the extendable. In the case of a cross currency swap, these are swap curves from both currencies' interest rate markets, volatility information from swaptions and caps and floors from both markets, as well as forward curves for the currency pair and option prices for the currency pair. The credit processes that define the probabilities of default are calibrated using the credit default swap curves for each of the two counterparties. In the cases where credit default swap curves are not available, the model can be calibrated to curves generated from their corporate bond credit spreads. In cases where neither is available, or neither provides enough information to calibrate the model, comparable credit data can be used to approximate the credit default swap curves for one or both counterparties.

These models preferably are implemented on Solaris and Linux systems, and preferably are run through system calls from Windows based PCs. This enables a trader to use software to calculate and recalculate different examples of a trade as well as to calculate the risks from a trade once it is on the books and incorporated into the trader's daily risk runs.

As will be recognized, the above methods may be executed using computer systems designed to analyze all of the factors present to determine the best swap terms for both parties. Such a system may weigh the risks of default, the values of the interest rates of the swap (both fixed and variable), the final value of the swap, first (and subsequent) year cash flows until the final extension, discounts on the future extensions based on default probabilities, credit spreads between the parties, historical events, random probabilities, or other swap related criteria as desired.

Thus, a preferred computer system embodiment may include an analysis component operable to analyze factors related to swap terms, a risk component operable to calculate risk of default, an interest rate component operable to calculate values of interest rates related to a swap, a swap component operable to calculate a final value for a swap, a cash flow component operable to calculate cash flow, a discount component operable to calculate discounts on future extensions, and other components to perform the various tasks described herein.

For purposes of managing the market and credit risks inherent in the swap transaction, the swap may be modeled as a trade with certain cash flows for the first period and potential future cash flows for each period until the final extension. The model would then value each future extension period by discounting it by the probability that either the first party or the counterparty defaults during that extension period. Each subsequent extension period would be less likely to occur and thus discounted by a greater amount (i.e., there would be a higher chance of default for each subsequent extension period).

In one embodiment the probabilities of default will be taken from market observable instruments such as credit default swaps. In other words, the preferred method for determining the probability of default is to evaluate instruments in the credit default market and use these instruments as a sampling to determine the probability of default for a particular period. One preferred method for achieving this is by using a Monte Carlo method to calculate the probability of a default for a given period. This probability is then preferably used to discount the future value of the extension. That is, the likelihood of default at each horizon (period) is calculated by using the Monte Carlo method, and the calculated (or expected) value of the future period is discounted based on this probability, which may also include discounting the future extension to present value and then discounting further by the probability of default.

As will be recognized, in order to hedge a trade, a party may utilize various known methods to reduce potential liabilities or offset risk including, for example, offsetting interest rate risks with an amortizing interest rate swap that goes out to the final extension date, or by hedging credit spreads by entering into credit default swaps, or using other hedging instruments relating to either party.

Referring to FIG. 1, in step 120, the parties negotiate and enter an extendable swap. The parties preferably negotiate the terms of the extendable swap using the data generated in step 110. In particular, the pricing of the swap preferably is based on the values and default probabilities discussed above.

Further, the parties may negotiate other transaction terms, such as the start date of the swap, the end date of the swap, the length of the swap (one period), the number of periods that the swap may be extended (e.g., the maximum life of the extendable swap or the final termination date of the extendable swap), conditions precedent to extension, principal amounts, payment amounts, payment terms (e.g., payment intervals, principal exchanges, etc.), interest rates, currency exchange rates, etc. In a preferred embodiment, the negotiated terms of the extendable swap are based on calculations performed in step 110 and preferably include the relevant financial requirements of the extendable swap, subject to any additional requirements of a Master Agreement, schedule, or confirmation as described above.

In one embodiment, the parties to an extendable swap negotiate a netting clause whereby mutual payments owed each pay period are netted, and only one party is required to make a payment. Additionally, the parties may negotiate a set-off clause whereby any amounts owed to either party due to a default under the terms of the extendable interest rate swap may be reduced ("set-off") by payments or monies owed to the non-defaulting party wholly unrelated to the current extendable interest rate swap. Such clauses are known in the art, and are exemplified in the User's Guide to the 1992 ISDA Master Agreements, §V, and the 2002 ISDA Master Agreement, §6(h).

In a preferred embodiment, the parties enter into a swap agreement for a period of time that may be extended at the end of the period, up to the final termination date, if certain conditions precedent are met. For example, parties may enter into an extendable interest rate swap with a 1 year period extendable to a maximum of 10 years, or they may enter into an extendable cross currency swap with a 2 year period extendable to a maximum of 6 years.

Referring again to FIG. 1, in step 130, the parties to the extendable swap make payments as required. This may include payments owed under the extendable swap agreement (as negotiated in step 120) or payments owed to lenders or other entities not parties to the extendable swap (as established in step 110 or prior to the swap agreement). As mentioned above, under the terms of the extendable swap, payments between the parties may be netted, so that only one payment is made on the payment date.

Where the parties have agreed to make monthly payments, bi-monthly payments, quarterly payments, semi-annual payments, etc., payments, including netted payments, are made as required until the expiration of the period (see step 140). For example, where the period is one year, and the parties agreed to make netted quarterly payments, payments should be made quarterly until the anniversary of the start date of the extendable swap.

At the expiration of the current period, the conditions precedent are evaluated (step 150) and the swap is automatically extended only if all of the conditions precedent are met (step 160). In a preferred embodiment, if the swap is extended, the parties proceed under the terms of the negotiated extendable swap, and flow continues from step 130. In another embodiment, upon a successful extension, the parties may reevaluate the terms of the swap transaction and may amend any terms as required.

However, where a condition precedent is not met, the swap agreement is terminated (step 170) and no additional payments beyond the current period are owed by any party. As will be recognized, extinguishing a swap agreement in this manner does not release any party from independent obligations it may have to other lenders or entities as established in step 110. As will be further recognized, current period payments due may be netted or set-off as provided in the extendable swap agreement. As described above, when a transaction is not extended, no future liabilities beyond the current period can accrue.

As discussed above, the conditions precedent to an automatic renewal can be negotiated by the parties. However, in a preferred embodiment the conditions precedent are related to the creditworthiness of both parties and preferably are similar to those events described in an associated ISDA master agreement (e.g., loss of investment grade rating, bankruptcy event, failure to pay, cross default). If all of the conditions are not met at any time prior to the periodic extension date, the transaction will not be extended, and again, no additional payments are owed by any party.

In one embodiment, reaching the final termination date of the extendable swap may be considered a violation of a condition precedent, causing the swap to terminate. In this case, the condition precedent is that the final termination date has not been reached. In another embodiment, step 150 includes a separate determination of whether the final termination date has arrived. In yet another embodiment, a separate step evaluates whether the final termination date has arrived. After the final termination date has arrived, flow proceeds to step 170, and the swap is not extended.

In one embodiment, a computer system is operable to receive and store data items regarding parties, transactions, and counterparties to any number of transactions. For example, a database may store all transactions a first party has entered, all transaction terms, all conditions precedent for those transactions, information related to the counterparties to each transaction, and notifications received regarding the counterparties or any conditions precedent. For example, notifications may be received regarding the creditworthiness of a counterparty or that timely payments have not been made.

The computer system preferably also is adapted to analyze notifications in the context of the stored conditions precedent, and is operable to determine whether all of the conditions are met. The computer system may utilize an algorithm to determine whether a particular notification results in a violation of one or more conditions precedent. The computer system is further adapted to transmit notifications based on whether the conditions precedent are met. Notifications may be transmitted indicating that a particular transaction should or should not be extended or that a payment was not made or received. For example, after a determination that a default event has occurred, the computer system is operable to issue a notification indicating that an extension is not available for a particular transaction, or if it determines that a payment has not been made, it may set a flag for future evaluation.

For example, a computer system may be implemented and programmed with relevant models, e.g., pricing, estimating, valuation, and default probability models described above, as well as a database containing all of the transactions and counterparties to those transactions. As will be recognized, any relevant data may also be stored in the computer database. The computer system may then receive data from various sources regarding a master list of companies (e.g., all companies currently traded on the New York Stock Exchange, all Fortune 500 companies, or a specific set of companies as determined by the party). The master data set may then be parsed and organized based on its relationship to counterparties, or other predetermined associations. For example, all information pertaining to any counterparty may be stored and associated with that counterparty.

The following is an illustrative example of the flow described above in connection with FIG. 1. In this example, two parties enter into a one year extendable swap, with a final termination date falling on the tenth anniversary of the start of the swap. It is assumed that the parties have previously entered into an ISDA Master Agreement and may have associated schedules or other agreements in place.

A first party enters into a one-year extendable interest rate or extendable cross currency swap with a US Bankruptcy Code-eligible or FIDICIA-eligible counterparty organized under the laws of one of the 50 states or under Federal law (in the case of certain banks). Each such swap would be automatically extended for an additional year, up to a maximum of, for example, nine additional years, if certain conditions precedent exist with respect to both parties on each annual anniversary date of the transaction (up to the ten-year cap on the trade). The conditions precedent may be related to the creditworthiness of both parties and are preferably similar in nature to certain Events of Default and Additional Termination Events typically included under the ISDA Master Agreement (e.g., loss of investment grade rating, Bankruptcy event, failure to pay, cross default). If all of the conditions are not met at any time prior to an extension anniversary date, the transaction will not be extended on that date and no additional payments will be owed by either party.

Typical extendable swap transaction requirements include the following (although these may be reduced in certain circumstances): (i) the transaction is on-market (e.g., the execution price for the counterparty will be the same or better than the price of a similar 10-year non-extendable swap); (ii) both the first party and the counterparty are solvent within the meaning of the Bankruptcy Code at the time of entering into the transaction; (iii) the parties have executed an ISDA master agreement with terms comparable to master agreements with other counterparties of similar creditworthiness; and (iv) the first party is not an insider within the meaning of the Bankruptcy Code with respect to the counterparty.

The first party can offer more favorable pricing to the counterparty for an extendable swap because: (i) the first party's maximum potential risks of loss due to the failure of the counterparty are lower because the maximum potential net payments over any single year of the transaction are much lower than for a 10-year transaction; and (ii) the first party has a lower likelihood of paying a large sum to the counterparty upon early termination of the transaction as a result of either party's insolvency or other default, (iii) no additional liabilities past termination can be incurred by the first party, (iv) each party will be able to hedge potential liabilities yearly rather than hedge for the lifetime of the agreement, (v) the agreement will most likely be granted safe harbor under the U.S. Bankruptcy Code. The first party may disclose to the counterparty the pricing differential between an extendable swap and a standard swap as well as the reasons (described above) why such pricing is available to the counterparty. A further benefit is that it will most likely be enforceable in accordance with its terms in the context of the first party or the counterparty's insolvency under the Bankruptcy Code (i.e., a court would not put any value on the transaction past an extension anniversary date if the conditions precedent are not present), and thus the first party is able to offer more attractive pricing than in the context of a standard long term swap.

Figure 2:
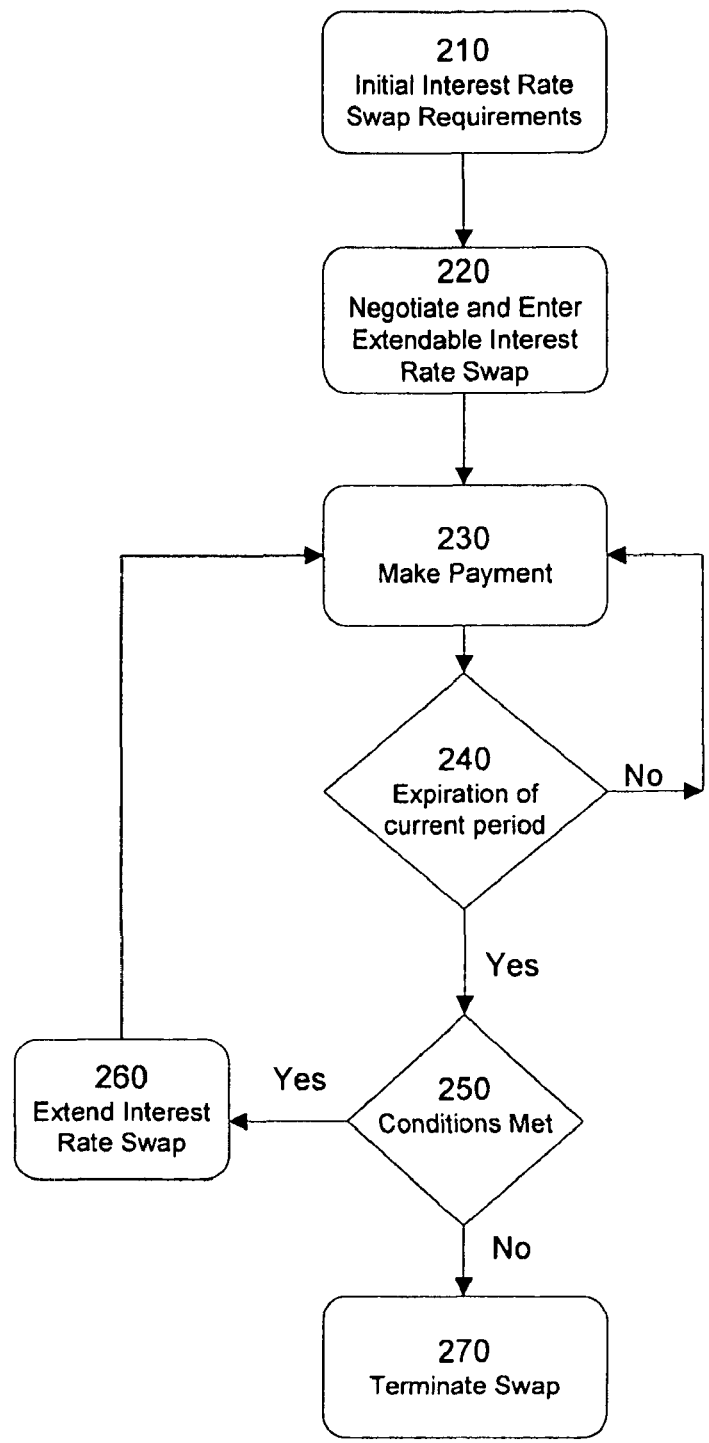
FIG. 2 is a flow diagram illustrating one embodiment of an extendable interest rate swap.

FIG. 2 is a flow diagram illustrating one embodiment of the extendable swap described in FIG. 1. As shown in FIG. 2, two or more parties may enter into an extendable interest rate swap. In an embodiment, each party to the extendable interest rate swap may have a direct counterparty, i.e., an opposite party to the transaction, wherein the party and counterparty both agree to fulfill obligations as defined in the interest rate swap agreement.

In step 210, the parties wishing to enter the extendable interest rate swap complete any preliminary requirements necessary to enter the extendable interest rate swap. As described above, the parties to an extendable interest rate swap preferably enter (or have previously entered) into an ISDA Master Agreement and may have other schedules or confirmations related to any number of additional transactions.

As illustrated above, other preliminary requirements may be fulfilled prior to negotiating or entering the extendable interest rate swap, including determining preliminary values necessary to calculate the terms of the extendable interest rate swap, determining default probability for a party or counterparty for a particular period, calculating the future value of a particular period of the interest rate swap, discounting a period's future value based on the calculated default probability, determining the payment terms of the extendable interest rate swap, determining the timing of the payments for the interest rate swap agreement, etc.

In a preferred embodiment, one or more of the parties to the extendable interest rate swap has previously entered into a separate loan agreement with an independent entity. This prior loan (or loans) preferably has associated interest rate payments that serve as the basis for the interest rate swap transaction. Such prior loan arrangements are discussed in greater detail in connection with FIGS. 3-4.

In step 220, the parties negotiate and enter into an extendable interest rate swap. The parties preferably negotiate the terms of the extendable interest rate swap using the data generated in step 210. As detailed above, the negotiated terms may include the pricing of the interest rate swap, the start date, the end date, the length of the interest rate swap (one period), the number of periods that the interest rate swap may be extended, conditions precedent to extension, principal amounts, payment amounts, payment terms (e.g., payment intervals, principal exchanges, etc.), interest rates, currency exchange rates, set-off clauses, etc. As further detailed above, the negotiated terms of the extendable interest rate swap preferably include all of the relevant financial requirements of the extendable interest rate swap, subject to any additional requirements of a Master Agreement, other schedule, or confirmation as described above.

In step 230, the parties make payments pursuant to any initial agreements or pursuant to the extendable interest rate swap agreement negotiated in step 220 until the expiration of the current period (step 240). As mentioned above, such payments are preferably based upon a notional principal and are typically netted.

Analogous to the flow in FIG. 1, at the expiration of the current period, the conditions precedent are evaluated (step 250) and the interest rate swap is automatically extended only if all of the conditions precedent are met (step 260). In the preferred embodiment, if the interest rate swap is extended, the parties proceed under the terms of the negotiated extendable interest rate swap, and flow continues from step 230. In another preferred embodiment, upon a successful extension, the parties may reevaluate the terms of the interest rate swap transaction and may amend any negotiated terms.

However, where any condition is not met, the interest rate swap agreement is terminated (step 270) and no additional payments are owed by any party. As will be recognized, extinguishing an interest rate swap agreement in this manner does not release any party from independent obligations it may have to other lenders or entities as established in step 210.

As discussed above, the conditions precedent to an automatic renewal can be negotiated by the parties, and may be related to the creditworthiness of both parties (similar to the descriptions provided by the associated ISDA Master Agreement). If all of the conditions are not met at any time prior to the periodic extension date, the transaction will not be extended, and again, no additional payments are owed by any party.

Figure 3:
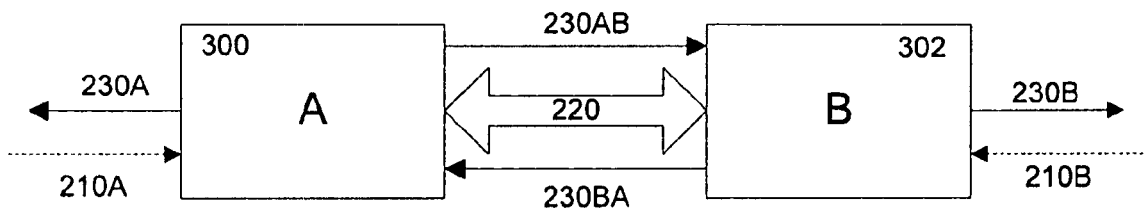
FIG. 3 is a block/flow diagram illustrating one embodiment of a two party extendable interest rate swap.

FIG. 3 is a block/flow diagram illustrating the relationships between the parties in one embodiment of a two party extendable interest rate swap as described in FIG. 2. As will be recognized, only steps 210-230 are described in detail, however, steps 240-270 are completed as described in connection with FIG. 2. For ease of explanation, flow steps analogous to those illustrated in FIG. 2 are numbered similarly. Additionally, where a step relates only to one party, that step retains a similar number, with an additional identifier for the related party, e.g., 210A relates to step 210 for party A only. Where a step relates to two parties, the direction of flow is also indicated, e.g., since step 230 deals with payments made, 230AB indicates that in step 230 payments are made from A to B, and 230BA indicates payments are made from B to A. As will be recognized, this mechanism is for ease of explanation, and netting payments between the parties may still apply, resulting in only one payment between the parties. Further, where no additional identifier is present, the step pertains to both parties.

Shown in FIG. 3 are two parties, A (300) and B (302). In the preferred embodiment, A desires to swap a current interest rate payment, e.g., fixed for floating or floating for fixed. In order to do so, A may enter into an extendable interest rate swap with B. In this preferred embodiment, B is a swap dealer that specializes in interest rate swaps. In an alternate embodiment, A may contract with a party that is not a swap dealer, e.g., a second lending institution, or a party wishing to swap its current interest rate payment, etc.

In step 210A, A may receive funds that serve as the principal amount for the interest rate payment A desires to swap. These funds may come from any source, but in a preferred embodiment, they are received as part of a prior loan agreement A has entered into. For example, A may have entered into a loan agreement with a lender contracting to make monthly fixed interest rate payments of 5.00% on the principal amount for 5 years. In one embodiment, B is a swap dealer or independent lender, whereby B does not enter into a preliminary loan agreement and accordingly does not receive funds in step 210B or make interest rate payments in step 230B. In another embodiment, B is a counterparty wishing to swap its current interest rate payments, and has previously entered into a loan agreement and received funds from a lender (210B) and will also make interest rate payments in step 230B.

In step 220, A and B negotiate and enter into an extendable interest rate swap. As described above, the negotiated terms are included in the extendable interest rate swap agreement entered into in step 220. As will recognized, additional preliminary requirements (described above) may have been fulfilled prior to A and B entering into the extendable interest rate swap. Further, as described above, the extendable interest rate swap agreement contains all of the necessary provisions, schedules, and confirmations, and is preferably governed by an already existing ISDA Master Agreement.

In a preferred embodiment, A and B have agreed that A will make a floating rate payment to B based on some floating rate (e.g., the prime rate), and B will make a fixed payment (e.g., 5.00%), with both payments based on A's principal loan amount. In step 230A, A makes the required fixed interest rate payment to its lender, and also receives a fixed interest rate payment from B (230BA). Additionally, A makes a floating rate payment to B (230AB). These payments should be made until the end of the period, at which time the conditions precedent are evaluated as described above. The flow then continues as described in connection with FIG. 2.

As a result of this embodiment, A has swapped its original fixed rate payment into a floating rate payment since B's payment to A nets out A's fixed rate payment and A also makes a floating payment to B, i.e., A pays fixed and receives fixed (netting to zero), and also pays floating.

In another embodiment, rather than being a swap dealer or independent lender, B may have also previously entered into a loan agreement making interest payments that it wishes to swap. Where A currently makes a fixed payment and B currently makes a floating payment (or vice versa), they may enter into an extendable interest rate swap. In this embodiment, in addition to A and B making payments to each other, both A and B will make separate payments to their original lenders (230A and 230B). A will make two payments (230A and 230AB) and receive one payment (230BA), with 230A and 230BA netting to zero, resulting in A swapping its original fixed interest rate payment, 230A, for a floating payment, 230AB. Likewise, B will make two payments (230B and 230BA) and receive on payment (230AB), with 230B and 230AB netting to zero, resulting in B swapping its original floating interest rate payment, 230B, for a fixed one, 230BA.

For example, suppose A and B have both entered into prior loan agreements whereby A must pay a 5.00% fixed rate to its bank and B must pay a floating Prime Rate to its bank. After entering into an extendable interest rate swap, A and B will have agreed that A will make a floating interest rate payment (Prime Rate) to B and B will make a fixed interest rate payment (5.00%) to A, with both payments based on their respective principal loan amounts. In step 230A, A makes the required fixed 5.00% interest rate payment to its original lender, and A also receives a fixed 5.00% interest rate payment from B (230BA). Additionally, A makes a floating rate payment to B (230AB). B, on the other hand, makes a required floating interest rate payment to its original lender (230B) and also receives a floating interest rate payment from A (230AB). Additionally, B makes a fixed interest rate payment to A (230BA). Accordingly, A has swapped its original fixed interest rate payment for a floating payment, and B has swapped its original floating interest rate payment for a fixed one.

These payments are made pursuant to the negotiated extendable interest rate swap agreement until the end of the period, at which time the conditions precedent are evaluated and flow continues as described in connection with FIG. 2.

Figure 4:
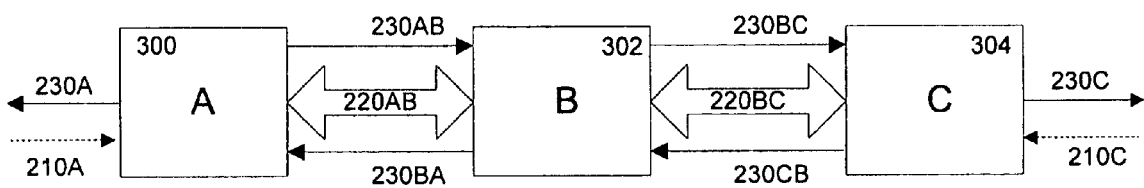
FIG. 4 is a block/flow diagram illustrating another embodiment of a two party extendable interest rate swap.

FIG. 4 is a block/flow diagram illustrating the relationships between the parties in one embodiment of a three party extendable interest rate swap as described in FIG. 2. As will be recognized, only steps 210-230 are described in detail, however, steps 240-270 are completed as described in connection with FIG. 2. The numbering convention used above is used with respect to FIG. 4, e.g., 210A relates to step 210 for party A only, 230AB indicates that in step 230 payments are made from A to B, 230BA indicates payments are made from B to A, etc. As noted above, this mechanism is for ease of explanation, and netting payments between the parties may still apply, resulting in only one payment between the parties.

Shown in FIG. 4 are three parties, A (300), B (302), and C (304). In the preferred embodiment, A and C desire to swap current interest rate payments, however, are not able to do so with each other directly. B is a swap dealer or independent party that preferably enters into numerous extendable interest rate swaps. When B enters one swap transaction, B is then able to pursue a complementary extendable interest rate swap transaction such that the two extendable interest rate swaps result in a favorable hedging position, or even a perfect hedge. Further, B may attempt to negotiate both extendable interest rate swaps at the same time to further eliminate any risk associated with the transactions.

In FIG. 4, both A and C enter into independent extendable interest rate swaps with a broker or independent lender B. In a preferred embodiment, the terms of the extendable interest rate swap between A and B as well as B and C are similar to those described in connection with FIG. 3, with one swap being a fixed for floating swap, and the other being a floating for fixed swap. As the financial relationship between A and C is inversely related, B benefits with any fluctuation in the market, i.e., B has entered into two offsetting extendable interest rate swaps.

As will be recognized, the computer system disclosed above may be further adapted to store data relating to existing swap agreements and analyze this data to determine favorable counter swap agreements, e.g., swap agreements that will result in a three party swap agreement as shown in FIG. 4, or that will result in a hedged position resembling a three party swap agreement. Further, the computer system may be adapted to evaluate all existing swap agreements and provide feedback regarding existing swap agreements. Such feedback may indicate the relationships between swaps, such as, the number of fixed for floating swaps, the number of floating for fixed swaps, the likelihood that certain swaps may be favorable counter swaps, i.e., two swaps that result in perfect or near perfect hedges. The computer system may then determine the amount of exposure based on all swaps, including the pairs of counter swaps, and send out notifications regarding this exposure as well as any unpaired swap agreements. The computer system may further be adapted to suggest likely pairings as well as automatically pairing swap agreements based on user parameters, e.g., perfect hedges.

Figure 5:
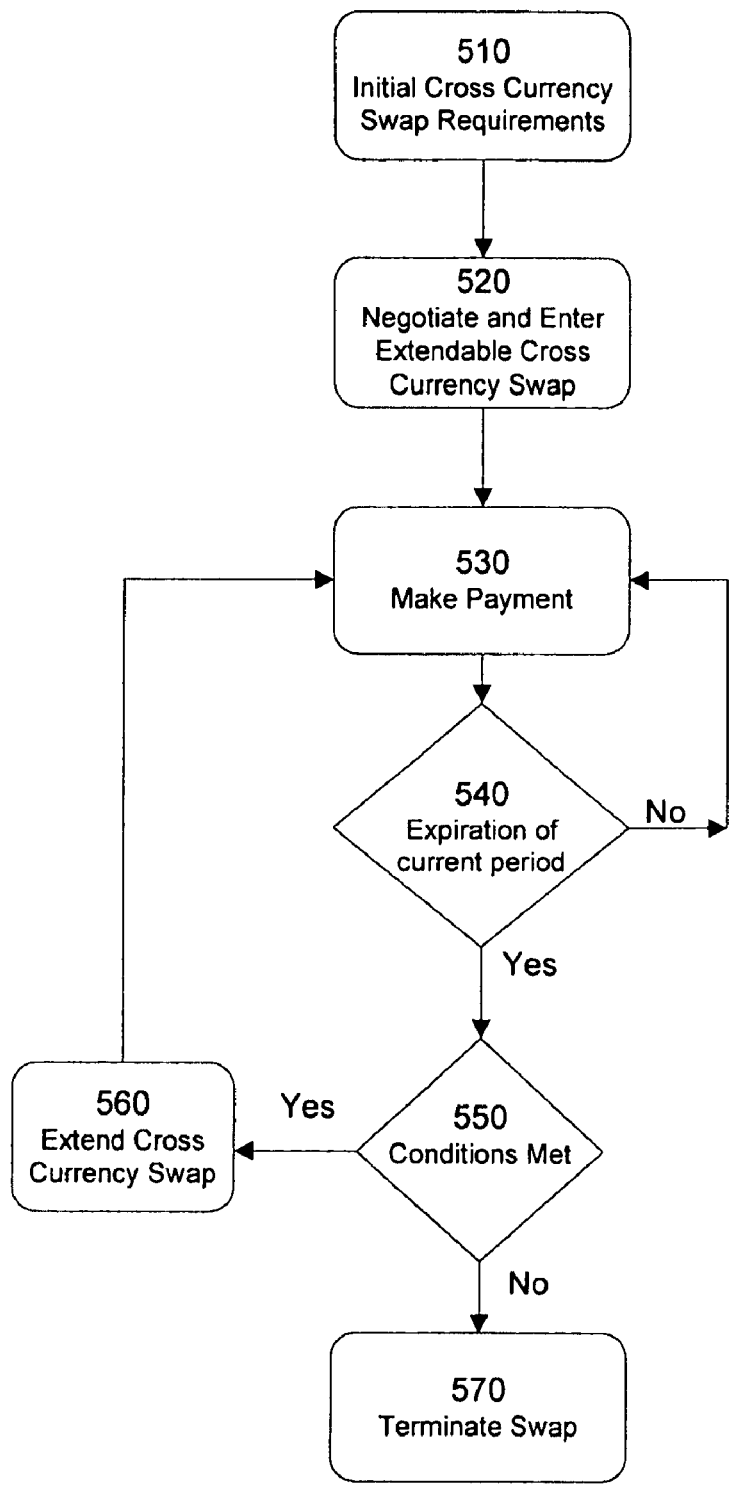
FIG. 5 is a block/flow diagram illustrating one embodiment of a three party extendable interest rate swap.

FIG. 5 is a flow diagram illustrating one embodiment of the extendable cross currency swap described in FIG. 1. In FIG. 5, two or more parties may enter into an extendable cross currency swap. As discussed previously, each party to the extendable cross currency swap will have a counterparty, i.e., an opposite party to the transaction, wherein the party and counterparty both agree to fulfill obligations as defined in the extendable cross currency swap agreement.

As known in the art, a cross currency swap is similar in form to an interest rate swap, however, terms of the swap transaction are based on different currencies. As further known in the art, the parties to cross currency swaps may agree to swap a fixed interest rate payment in one currency for a fixed interest rate payment in another currency (fixed for fixed), a floating interest rate payment in one currency for a floating interest rate payment in another currency (floating for floating), or a fixed interest rate payment in one currency for a floating interest rate payment in another currency (fixed for floating/floating for fixed). Additionally, notional principal amounts may be used, however, in a preferred embodiment actual principal amounts are exchanged at the outset and termination to eliminate exposure due to foreign exchange rate fluctuations. Where notional principals amounts are used, the change in value is exchanged at maturity (final termination date). Where actual principal is used, the principal amounts are exchanged at both the start and end of the agreement at the same exchanged rate, thus eliminating the need for hedging principal amounts.

In step 510, the parties wishing to enter an extendable cross currency swap complete any preliminary requirements necessary to enter the extendable cross currency swap. As described above, the parties to an extendable cross currency swap preferably enter (or have previously entered) into an ISDA Master Agreement and may have other schedules or confirmations related to any number of additional transactions.

As illustrated above, other preliminary requirements may be fulfilled prior to negotiating or entering the extendable cross currency swap, including determining preliminary values necessary to calculate the terms of the extendable cross currency swap, determining default probability for a party or counterparty for a particular period, calculating the future value of a particular period of the cross currency swap, discounting a period's future value based on the calculated default probability, determining the payment terms of the extendable cross currency swap, determining the timing of the payments for the cross currency swap agreement, etc.

In a preferred embodiment, one or more of the parties to the extendable cross currency swap has previously entered into a separate loan agreement with an independent entity. This prior loan (or loans) preferably has associated interest rate payments in one currency that serve as the basis for the cross currency swap transaction. Such prior loan arrangements are discussed in greater detail in connection with FIGS. 6-7.

In step 520, the parties negotiate and enter into the extendable cross currency swap. The parties preferably negotiate the terms of the extendable cross currency swap using the data generated in step 510. As detailed above, the negotiated terms may include the pricing of the cross currency swap, the start date, the end date, the length of the cross currency swap (one period), the number of periods that the cross currency swap may be extended, conditions precedent to extension, principal amounts, payment amounts, payment terms (e.g., payment intervals, principal exchanges, etc.), interest rates, currency exchange rates, set-off clauses, etc. As further detailed above, the negotiated terms of the extendable cross currency swap preferably include all of the relevant financial requirements of the extendable cross currency swap, subject to any additional requirements of a Master Agreement, other schedule, or confirmation as described above.

In step 530, the parties make payments pursuant to any initial agreements or pursuant to the extendable cross currency swap agreement negotiated in step 520 until the expiration of the current period (step 540). As noted above, payments between the parties are typically netted.

Analogous to the flow in FIG. 1, at the expiration of the current period, the conditions precedent are evaluated (step 550) and the cross currency swap is automatically extended only if all of the conditions precedent are met (step 560). In the preferred embodiment, if the cross currency swap is extended, the parties proceed under the terms of the negotiated extendable cross currency swap, and flow continues from step 530. In another embodiment, upon a successful extension, the parties may reevaluate the terms of the cross currency swap transaction and may amend any negotiated terms.

Where any condition precedent is not met, the cross currency swap agreement is not extended (step 570) and no additional payments are owed by any party. As will be recognized, extinguishing a cross currency swap agreement in this manner does not release any party from independent obligations it may have to other lenders or entities as established in step 510.

As discussed above, the conditions precedent to an automatic renewal can be negotiated by the parties, and may be related to the creditworthiness of both parties (similar to the descriptions provided by the associated ISDA Master Agreement). If all of the conditions are not met at any time prior to the periodic extension date, the transaction will not be extended, and again, no additional payments are owed by any party.

Figure 6:
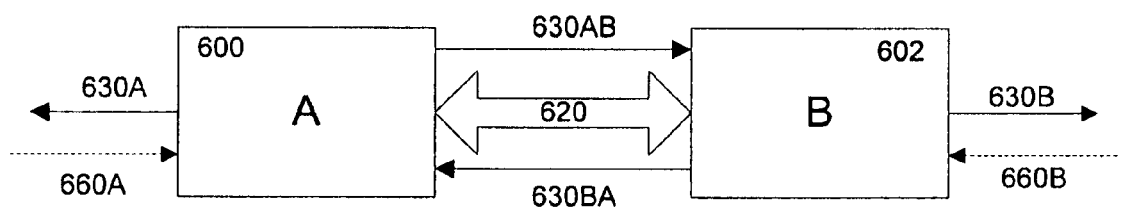
FIG. 6 is a flow diagram illustrating one embodiment of an extendable cross currency swap.

FIG. 6 is a block/flow diagram illustrating the relationships between the parties in one embodiment of a two party extendable cross currency swap as described in FIG. 5. As will be recognized, only steps 510-530 are described in detail, however, steps 540-570 are completed as described in connection with FIG. 5. The numbering convention used above is again used with respect to FIG. 6, e.g., 610A relates to step 610 for party A only, 630AB indicates that in step 630 payments are made from A to B, 630BA indicates payments are made from B to A, etc. As noted above, this mechanism is for ease of explanation, and netting payments between the parties may still apply, resulting in only one payment between the parties.

Shown in FIG. 6 are two parties, A (600) and B (602). In the preferred embodiment, A desires to swap a current interest rate payment in one currency for an interest rate payment in another currency, e.g., fixed for fixed, floating for floating, or floating for fixed. In order to do so, A may enter into an extendable cross currency swap with B. In a preferred embodiment, B is a swap dealer that specializes in cross currency swaps. In an alternate embodiment, A may contract with a party that is not a swap dealer, e.g., a second lending institution, or a party wishing to swap its current interest rate payment, etc.

In step 610A, A may receive funds in one currency that serve as the principal amount for the interest rate payment A desires to swap. These funds may come from any source, but in a preferred embodiment, they are received as part of a prior loan agreement A has entered into. For example, A may have entered into a loan agreement with a lender contracting to make monthly fixed interest rate payments of 5.00%, in Euros (E), on the principal amount for 5 years. In one embodiment, B is a swap dealer or independent lender, whereby B does not enter into a preliminary loan agreement and accordingly does not receive funds in step 610B or make interest rate payments in step 630B. In another embodiment, B is a counterparty wishing to swap its current interest rate payments, and has previously entered into a loan agreement and received funds from a lender (610B) and will also make interest rate payments in step 630B.

In step 620, A and B negotiate and enter into an extendable cross currency swap. As described above, the negotiated terms are included in the extendable cross currency swap agreement entered into in step 620. As will recognized, additional preliminary requirements (described above) may have been fulfilled prior to A and B entering into the extendable cross currency swap. Further, as described above, the extendable cross currency swap agreement contains all of the necessary provisions, schedules, and confirmations, and is preferably governed by an already existing ISDA Master Agreement.

In a preferred embodiment, A and B have agreed that A will make a floating rate payment in one currency (e.g., $) to B based on some floating rate (e.g., LIBOR), and B will make a fixed payment in another currency (e.g., €) to A. The amounts owed will be calculated based on the counterparty's respective principal amounts, i.e., A's payment in $ will be based on the LIBOR rate applied to B's $ principal amount, and B's payment in € will be based on the fixed rate applied to A's € principal amount.

In step 630A, A makes the required fixed interest rate payment in € to its lender, and also receives a fixed interest rate payment in € from B (630BA). Additionally, A makes a floating rate payment to B in $ (630AB). These payments should be made until the end of the period, at which time the conditions precedent are evaluated as described above. The flow then continues as described in connection with FIG. 6.

As a result of this embodiment, A has swapped its original fixed rate payment in € into a floating rate payment in $, since B's payment to A in nets out A's fixed rate payment in €, and A also makes a floating payment in $ to B, i.e., A pays fixed C - and receives fixed € (netting to zero), and also pays floating $.

In another embodiment, rather than being a swap dealer or independent lender, B may have also previously entered into a loan agreement making interest payments in one currency that it wishes to swap. Where A currently makes a fixed payment in one currency (e.g., $) and B currently makes a floating payment in a different currency (e.g., €), or vice versa, they may enter into an extendable cross currency swap. In this embodiment, in addition to A and B making payments to each other, both A and B will make separate payments to their original lenders (630A and 630B). A will make two payments (630A and 630AB) and receive one payment (630BA), with 630A and 630BA netting to zero, resulting in A swapping its original fixed interest rate payment in $ (630A), for a floating interest rate payment in E (630AB). Likewise, B will make two payments (630B and 630BA) and receive one payment (630AB), with 630B and 630AB netting to zero, resulting in B swapping its original floating interest rate payment in €, 630B, for a fixed interest rate payment in $, 630BA.

For example, suppose A and B have both entered into prior loan agreements whereby A must pay a 5.00% fixed rate to its bank in $ and B must pay a floating LIBOR rate to its bank in €. After entering into an extendable cross currency swap, A and B will have agreed that A will make a floating interest rate payment (LIBOR) to B and B will make a fixed interest rate payment (5.00%) to A, with both payments based on the counterparty's principal loan amounts. In step 630A, A makes the required fixed 5.00% interest rate payment to its original lender, in $, and A also receives a fixed 5.00% interest rate payment from B, also in $ (630BA). Additionally, A makes a floating rate payment to B, in € (630AB). B, on the other hand, makes a required floating interest rate payment to its original lender, in E (630B) and also receives a floating interest rate payment from A, in € (630AB). Additionally, B makes a fixed interest rate payment to A, in $ (630BA). Accordingly, A has swapped its original fixed interest rate payment in $ for a floating interest rate payment in E, and B has swapped its original floating interest rate payment for a fixed one.

These payments are made pursuant to the negotiated extendable cross currency swap agreement until the end of the period, at which time the conditions precedent are evaluated and flow continues as described in connection with FIG. 6.

The terms of a typical extendable cross currency swap are illustrated below. This example illustrates a typical extendable cross currency swap confirmation associated with an ISDA Master Agreement. As will be recognized, this example may be adapted to illustrate a typical extendable interest rate swap. The confirmation describes the terms of this particular transaction without defining the relationships between the parties (which are usually described in the Master Agreement) or other provisions the parties are bound by, e.g., in the Master Agreement, schedules, or other confirmations. In this example, two parties enter into an extendable cross currency swap with a one year period, extendable up to 10 years where conditions precedent are met each period. The principal amounts are € 100,000,000 and $133,000,000, with a fixed interest rate of 3.67 and a floating rate of LIBOR. The start date is in December of 2005, with a final termination date falling on the anniversary day in 2015.

Exemplary Terms for Extended Cross-Currency Swap

| | |
|---|---|
| Party A: | [First party] |
| Party B: | {counterparty} |
| Trade Date: | Dec. xx, 2005 |
| Effective Date: | Dec. xx, 2005 |
| Termination Date: | Dec. xx, 2006; subject to the Extension provision below. |
| Extension: | If, on the Termination Date, the Calculation Agent has determined that the [Conditions Precedent for Extension] have been met during the applicable Observation Period (an "Extension Event"), then the Termination Date shall be the date which falls one year immediately following the date which had been the Termination Date prior to the occurrence of such Extension Event; provided, however, that in no event shall the "Termination Date" be a date later than Dec. xx, 2015. |
| Conditions Precedent for Extension: | As determined by the Calculation Agent on the Termination Date, no [delivery [by either party to the other party] of [either] a Credit Event Notice [or] a Notice of Publicly Available Information] during the applicable Notice Delivery Period for a [Credit Event occurring in respect of a Reference Entity] during the applicable Observation Period. |
| Observation Period: | The period from, [and including the day which falls one year immediately preceding the Termination Date to, [and including), the earlier of (a) the Termination Date and (b) Dec. xx, 2015 (the "Observation Period End Date") |
| Credit Event: | Bankruptcy, Obligation Acceleration, Failure to Pay, Restructuring (each, as defined in the Credit Derivatives Definitions) |
| Obligations: | Borrowed Money (as defined in the Credit Derivatives Definitions) |
| Reference Entities: | [Party A, Party B] |
| Notice Delivery Period: | The period from, [and including the day which falls one year immediately preceding the applicable Observation Period End Date to, [and including the day which falls 14 calendar days after (a) if (i) the Credit Event that is the subject of the Credit Event Notice is a Failure to Pay that occurs after the Scheduled Termination Date and (ii) the Potential Failure to Pay with respect to such Failure to Pay occurs on or prior to the applicable Observation Period End Date, the Grace Period Extension Date or (b) otherwise, the Observation Period End Date. |
| Potential Failure to Pay: | As defined in the Credit Derivatives Definitions. |
| [Additional Notification Requirement: | As soon as practicable after the occurrence of an Extension Event, the Calculation Agent shall notify the parties that such event has occurred.] |
| Initial Exchange: | |
| Initial Rate: | 1.3300 [EUR/USD] |
| Initial Exchange Date: | Dec. xx, 2005 |
| Party A Initial Exchange Amount: | USD 133,000,000 |
| Party B Initial Exchange Amount: | EUR 100,000,000 |
| Party A Fixed Amounts: | 3.67% (semi-annual, Actual/360, Modified Following) on the Party B Initial Amount |
| Party B Floating Amounts: | LIBOR (semi-annual, Actual/360, Modified Following) on the Party A Initial Amount |
| Final Exchange: | If the Observation Period End Date is Dec. xx, 2015, on such Observation Period End Date and, as determined by the Calculation Agent on such Observation Period End Date, no [delivery [by either party to the other party] of [either] a Credit Event Notice [or] a Notice of Publicly Available Information] during the applicable Notice Delivery Period for a [Credit Event occurring in respect of a Reference Entity during the applicable Observation Period, Party A shall pay to Party B the Party A Final Exchange Amount and Party B shall pay to Party A the Party B Final Exchange Amount. |
| Final Rate: | The Initial Rate |
| Final Exchange Date: | The Observation Period End Date; provided, however, the "Final Exchange Date" may be postponed to any day up to the last day of the applicable Notice Delivery Period by delivery of a notice by a party to the other party indicating that a Potential Credit Event may have occurred on or prior to such Observation Period End Date. |
| Potential Credit Event: | An event that which after the giving of notice or the lapse of time or both, may constitute a Credit Event in respect of a Reference Entity, including, without limitation, a Potential Failure to Pay. |

| | |
|---|---|
| Party A Final Exchange Amount: | EUR 100,000,000 |
| Party B Final Exchange Amount: | USD 133,000,000 |
| LIBOR: | 6-month USD LIBOR BBA setting at 11:00am London time as published on Telerate page 3750. Backup source is average of 4 BBA reference banks providing quotations for deposits in U.S. Dollars, or if at least two such quotations are unavailable, average of 4 major New York banks providing quotations. |
| Business Days: | London and New York |
| Calculation Agent: | [Agreed entity or swap dealer] |

Figure 7:
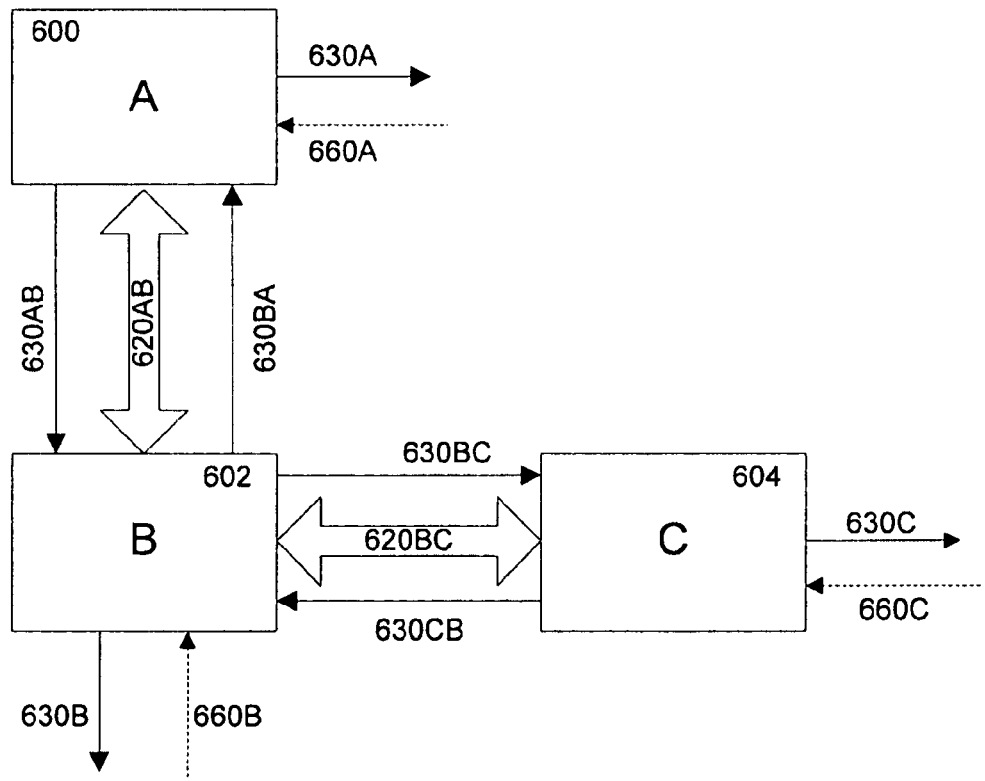
FIG. 7 is a block/flow diagram illustrating one embodiment of a two party cross currency extendable swap.

FIG. 7 is a block/flow diagram illustrating the relationships between the parties in one embodiment of a three party extendable cross currency swap as described in FIG. 5. As will be recognized, only steps 510-530 are described in detail, however, steps 540-570 are completed as described in connection with FIG. 5. The numbering convention used above is again used with respect to FIG. 7, e.g., 710A relates to step 710 for party A only, 730AB indicates that in step 730 payments are made from A to B, 630BA indicates payments are made from B to A, etc. As noted above, this mechanism is for ease of explanation, and netting payments between the parties may still apply, resulting in only one payment between the parties.

Shown in FIG. 7 are three parties, A (600), B (602), and C (604). In the preferred embodiment, A and C desire to swap current interest rate payments, however, are not able to do so with each other directly. B is a swap dealer or independent party that preferably enters into numerous extendable cross currency swaps. When B enters one swap transaction, B is then able to pursue a complementary extendable cross currency swap transaction such that the two extendable cross currency swaps result in a favorable hedging position, or even a perfect hedge. Further, B may attempt to negotiate both extendable cross currency swaps at the same time to further eliminate any risk associated with the transactions.

In FIG. 7, both A and C enter into independent extendable cross currency swaps with a broker or independent lender B. In a preferred embodiment, the terms of the extendable cross currency swap between A and B as well as B and C are similar to those described in connection with FIG. 5, with one swap being a fixed for floating swap, and the other being a floating for fixed swap. As the financial relationship between A and C is inversely related, B benefits with any fluctuation in the market, i.e., B has entered into two offsetting extendable cross currency swaps.

As will be recognized, the computer system disclosed above may be further adapted to store data relating to existing swap agreements and analyze this data to determine favorable counter swap agreements, e.g., swap agreements that will result in a three party swap agreement as shown in FIG. 7, or that will result in a hedged position resembling a three party swap agreement. Further, the computer system may be adapted to evaluate all existing swap agreements and provide feedback regarding existing swap agreements. Such feedback may indicate the relationships between swaps, such as, the number of fixed for floating swaps, the number of floating for fixed swaps, the likelihood that certain swaps may be favorable counter swaps, i.e., two swaps that result in perfect or near perfect hedges. The computer system may then determine the amount of exposure based on all swaps, including the pairs of counter swaps, and send out notifications regarding this exposure as well as any unpaired swap agreements. The computer system may further be adapted to suggest likely pairings as well as automatically pairing swap agreements based on user parameters, e.g., perfect hedges.

For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

While the present invention has been illustrated and described above regarding various embodiments, it is not intended to be limited to the details shown, since various modifications and structural changes may be made without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A computer system comprising:
   memory operable to store at least one program; and
   at least one processor communicatively coupled to the memory, in which the at least one program, when executed by the at least one processor, causes the at least one processor to:
   access and process data related to a party's existing extendable swap transactions;
   pair said party's existing extendable swap transactions with offsetting extendable swap transactions; and
   send a notification to the party relating to pairing said party's existing extendable swap transactions with said offsetting extendable swap transactions.

2. The system of claim 1 wherein said data related to the party's existing extendable swap transactions comprises information related to at least one of: existing fixed for floating extendable swap transactions, existing floating for fixed extendable swap transactions, and existing cross currency extendable swap transactions.

3. The system of claim 1 wherein pairing said party's existing extendable swap transactions with offsetting extendable swap transactions comprises evaluating a plurality of extendable swap transactions to identify extendable swap transactions that result in predefined hedging conditions.

4. The system of claim 3 wherein said hedging conditions result in an offsetting position.

5. The system of claim 3 wherein said extendable swap transactions are fixed for floating extendable swap transactions.

6. The system of claim 3, wherein said extendable swap transactions are floating for fixed extendable swap transactions.

7. The system of claim 3, wherein said extendable swap transactions are extendable cross currency swap transactions.

8. The system of claim 3, wherein said extendable swap transactions are extendable commodity swap transactions.

9. The system of claim 3, wherein said extendable swap transactions are extendable equity swap transactions.

10. The system of claim 3, wherein said extendable swap transactions are extendable currency swap transactions.

11. The system of claim 1 wherein said notification relating to offsetting transactions relates to one of the existence or absence of offsetting transactions.

12. The system of claim 1 wherein said notification relates to said party's financial exposure.

13. A non-transitory computer readable storage medium having computer-executable instructions recorded thereon that, when executed on a computer, configure the computer to perform a method comprising:
   accessing and processing data related to a party's existing extendable swap transactions;
   pairing said party's existing extendable swap transactions with offsetting extendable swap transactions; and
   sending a notification to the party relating to pairing said party's existing extendable swap transactions with said offsetting extendable swap transactions.

14. The non-transitory computer readable storage medium of claim 13 wherein said data related to the party's existing extendable swap transactions comprises information related to at least one of: existing fixed for floating extendable swap transactions, existing floating for fixed extendable swap transactions, and existing cross currency extendable swap transactions.

15. The non-transitory computer readable storage medium of claim 13 wherein pairing said party's existing extendable swap transactions with offsetting extendable swap transactions comprises evaluating a plurality of extendable swap transactions to identify extendable swap transactions that result in predefined hedging conditions.

16. The non-transitory computer readable storage medium of claim 15 wherein said hedging conditions result in an offsetting position.

17. The non-transitory computer readable storage medium of claim 15 wherein said extendable swap transactions are fixed for floating extendable swap transactions.

18. The non-transitory computer readable storage medium of claim 15, wherein said extendable swap transactions are floating for fixed extendable swap transactions.

19. The non-transitory computer readable storage medium of claim 15, wherein said extendable swap transactions are extendable cross currency swap transactions.

20. The non-transitory computer readable storage medium of claim 15, wherein said extendable swap transactions are extendable commodity swap transactions.

21. The non-transitory computer readable storage medium of claim 15, wherein said extendable swap transactions are extendable equity swap transactions.

22. The non-transitory computer readable storage medium of claim 15, wherein said extendable swap transactions are extendable currency swap transactions.

23. The non-transitory computer readable storage medium of claim 15 wherein said notification relating to offsetting transactions relates to one of the existence or absence of offsetting transactions.

24. The non-transitory computer readable storage medium of claim 13 wherein said notification relates to said party's financial exposure.

* * * * *